United States Patent [19]

Binks et al.

[11] Patent Number: 4,533,792
[45] Date of Patent: Aug. 6, 1985

[54] CIRCUIT FOR SWITCHING BETWEEN RING SIGNAL AND MESSAGE WAITING SIGNAL WITHOUT BELL TAP

[75] Inventors: Ronald Binks; Anthony S. Rehak, both of Deerfield Beach; Howard Sinberg, Coral Springs, all of Fla.

[73] Assignee: Siemens Corporate Research & Support, Inc., Iselin, N.J.

[21] Appl. No.: 595,155

[22] Filed: Mar. 30, 1984

[51] Int. Cl.³ .............................................. H04M 3/42
[52] U.S. Cl. ............................ 179/84 C; 179/18 BG
[58] Field of Search .............. 179/84 C, 18 BG, 18 B, 179/84 L, 99 LS, 81 C

[56] References Cited

U.S. PATENT DOCUMENTS 3,826,876  7/1974  Gueldenpfenning et al. .... 179/84 C
3,919,492  11/1975  Borland ....................... 179/99 LS X
4,266,101  5/1981  Dunbar ............................. 179/84 C Primary Examiner—Gene Z. Rubinson
Assistant Examiner—James L. Dwyer
Attorney, Agent, or Firm—Thomas H. Jackson

[57] ABSTRACT

The invention relates to a circuit for switching between a ring signal and a message waiting signal in a telephone system, such as a PBX, without the occurrence of "bell tap". The instantaneous value of the ring signal is compared with a D-C value of the message waiting signal to generate a smooth transition between the ring and message waiting states of the composite RAC/MW signal. The circuit selectively suppresses the controlling edge of the ring synchronous signal whenever a particular subscriber station would be connected to the RAC/MW signal at an inappropriate time. Accordingly, the problem of "bell tap" is eliminated.

6 Claims, 2 Drawing Figures

CIRCUIT FOR SWITCHING BETWEEN RING SIGNAL AND MESSAGE WAITING SIGNAL WITHOUT BELL TAP

BACKGROUND OF THE INVENTION

This invention relates to a signal generating and control circuit for a telephone system such as a private branch exchange (PBX), which controls operation of audible and visual subscriber station instrument signaling devices.

In such systems a composite signal comprising audible and visual control signals alternately spaced in time, selectively energizes the ringer or message waiting lamp in subscriber instruments. These audible and visual signals energize ringers and neon lamps respectively at subscriber stations of a PBX via a common bus, to which each station may be selectively connected, via an individual single wire path for each station. The present invention can be utilized with the circuit disclosed in U.S. Pat. No. 4,266,101, which is hereby incorporated by reference.

A common problem with existing systems is "bell tap", which is transient energizing of the ringer, which occurs when switching between the audible signal and the visual signal states. In addition, a rapid load change, which can occur when a hand set of a subscriber station receiving a visual signal is taken off-hook, may cause "bell tap" to occur at other subscriber stations connected to the same signal source.

SUMMARY OF THE INVENTION

The object of the present invention is to provide a control circuit for providing both visual and audible signals on the same wire pair, which eliminates the problem of "bell tap".

In general, the invention features, in one aspect, a circuit for switching between a ring signal and a message waiting signal without bell tap in a telephone system, which includes:

(a) apparatus for generating a composite RAC/MW signal which includes an A-C signal and a D-C signal alternately spaced in time;

(b) a switch enable-signal generator which includes a comparator for comparing the instantaneous value of the A-C signal with the value of the D-C signal, wherein the switch enable generator provides a signal for changing the composite signal from an A-C signal to a D-C signal only when the instantaneous value of the A-C signal equals the value of the D-C signal and the slope is negative;

(c) apparatus for providing either a RAC or MW signal to a particular subscriber station of a telephone system in response to an external command synchronous signal;

(d) a RAC voltage zero crossing detector and synchronous signal generator for detecting when the A-C crosses the zero point, and controlling when the appropriate RAC or MW signal is provided to a subscriber station in a telephone system; and (e) a synchronous edge suppression circuit for suppressing the first ring synchronous pulse from the ring synchronous signal when the means for providing either an RAC or MW signal to a particular subscriber station signals that an MW signal should be provided during the time interval between the A-C signal crossing the D-C signal with a negative slope and before the subsequent positive going ring synchronous signal.

In preferred embodiment of the circuit the apparatus for generating a composite RAC/MW signal includes an RAC generator which provides a continuous A-C signal, an MW signal generator which derives a D-C signal from the A-C signal, and switching apparatus for combining the A-C and D-C signals into a composite RAC/MW signal; the switching apparatus includes a plurality of optically gated silicon controlled rectifiers each optically coupled with an associated light emitting diode and a plurality of D-type flip-flops which control when the light emitting diodes are activated/deactivated; and the apparatus for providing either an RAC or MW signal to a particular subscriber station includes a station line circuit connecting the subscriber station with the circuit for switching between the ring signal and the message waiting signal, wherein the station line circuit includes a relay, responsive to an external command signal, which controls transmission of ring signal or message waiting signal to a particular subscriber station.

Other features and advantages of the present invention will become apparent from the following detailed description, and from the claims.

For a full understanding of the present invention, reference should now be made to the following detailed description and to the accompanying drawings.

DETAILED DESCRIPTION

The present invention discloses apparatus for generating a composite signal (RAC/MW signal) comprising an audible control signal (ring AC or RAC signal), for energizing ringers at subscriber stations, and a D-C voltage (message waiting or MW signal) for energizing neon lamp indicators at the subscriber stations of a PBX.

Figure 1:
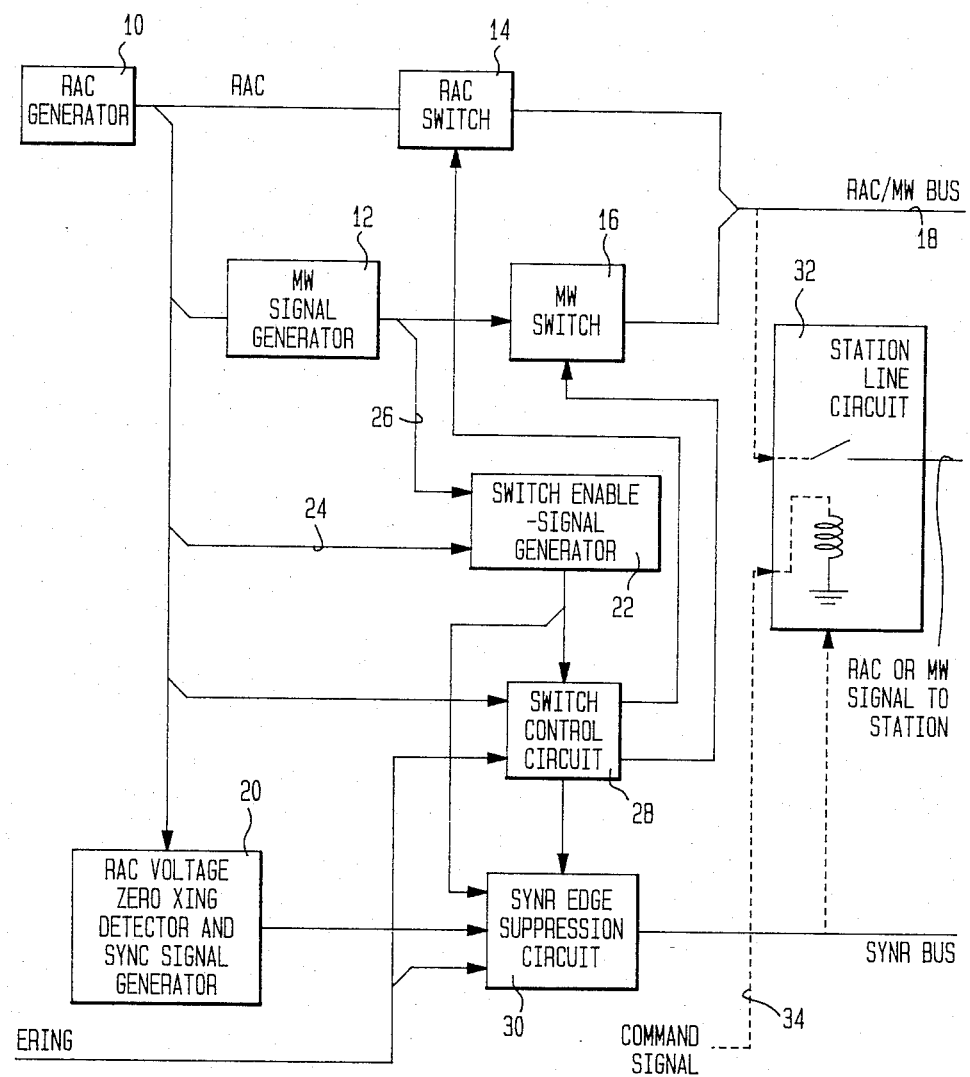
FIG. 1 shows diagrammatically a circuit for switching between a ring signal and a message waiting signal.

Referring to FIG. 1, a block diagram of the apparatus is shown. RAC generator 10 sends out a continuous ring signal which is a 90 volt (RMS), 20 Hz alternating current signal. MW signal generator 12 derives a 90 volt D-C message waiting signal from the A-C signal supplied by RAC generator 10. RAC switch 14 and MW switch 16 operate sequentially to create the signal appearing on RAC/MW bus 18. This signal, which is always available on bus 18, is an alternating A-C, D-C signal composed of ring signals and message waiting signals alternately spaced in time.

RAC voltage zero crossing detector and synchronous signal generator 20 controls when to turn on the ring or message waiting signal which is to be sent to the subscriber station. It detects when the RAC signal crosses its zero point and generates a square wave (ring SYNC signal) which is synchronous with zero crossing of the RAC signal.

Switch enable signal generator 22 is a voltage comparator which compares the instantaneous value of an RAC signal received from generator 10, via line 24, with the message waiting signal value received from generator 12, via line 26. The comparator (generator 22) sends out a "1" when these values are both equal and there is a decreasing or negative slope of RAC. When the values are equal but the slope of RAC is positive, the comparator sends out a "0". The signal on RAC/MW bus 18 only changes from the RAC signal to the message waiting signal when a "1" is provided by the comparator.

Switch control circuit 28 is a D type flip-flop, which operates under the control of generator 22, to cause switches 14 and 16 to turn on/off to produce the RAC/MW signal on bus 18.

Synchronous edge suppression circuit 30 suppresses the first ring synchronous pulse of the output of RAC voltage zero cross detector and synchronous signal generator 20 under certain conditions. Whenever the enable signal (E-ring provided externally for example, by the system CPU-not shown) commands the system to go to a message waiting signal between the time the AC signal crosses the D-C signal with a negative slope and before the next positive going ring synchronous pulse, the first ring synchronous pulse of the ring SYNC signal is suppressed.

Station line circuit 32 is a line card which contains a relay for connecting the message waiting signal or the RAC signal to a subscriber station. The command signal, supplied to station line circuit 32 via line 34, tells the relay to go on or off at the zero crossing of the ring signal. The time at which the relay goes on/off determines whether the subscriber station receives a message waiting signal or an RAC signal (or neither if the relay is not energized at all).

Figure 2:
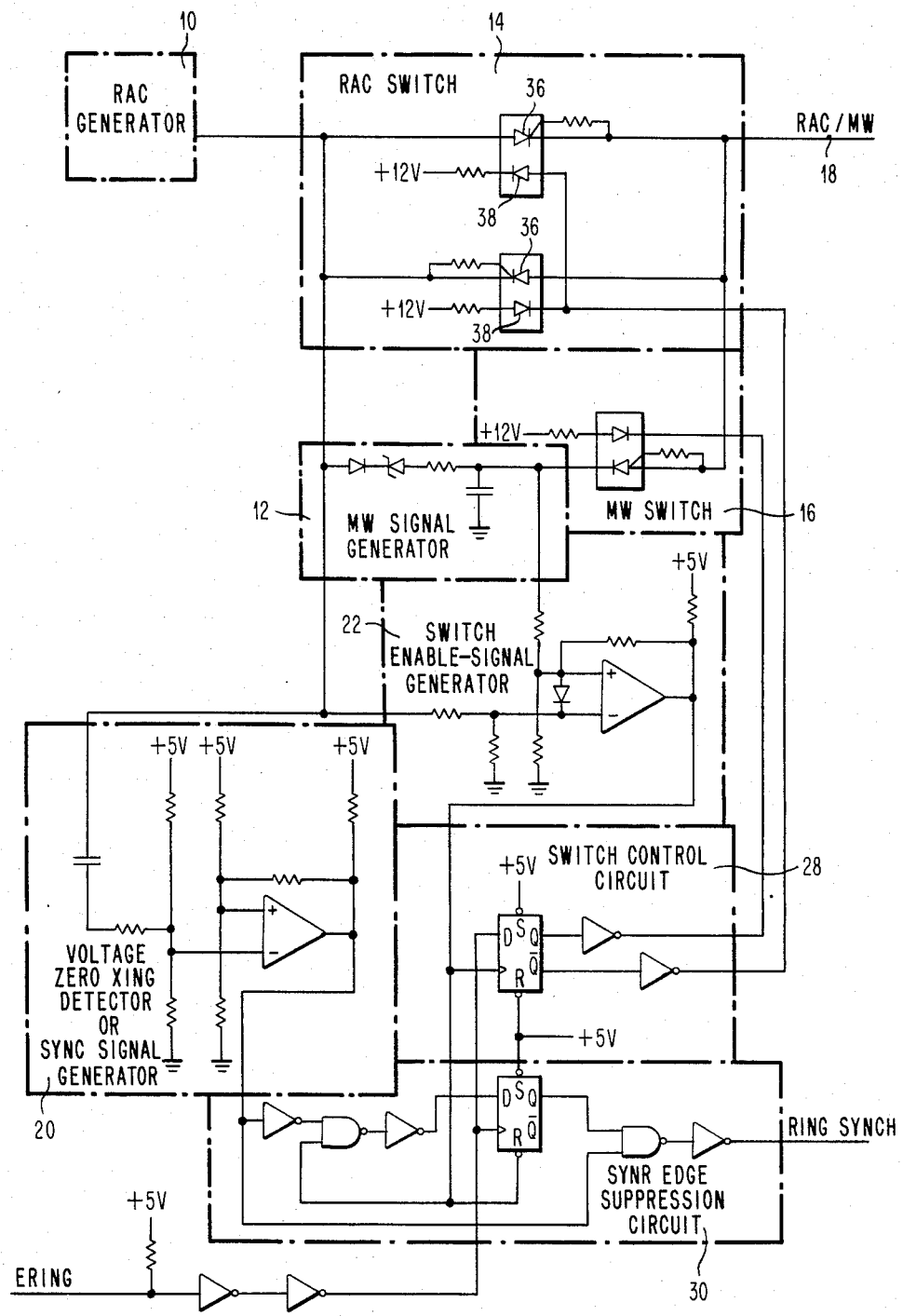
FIG. 2 shows schematically details of the circuit shown in FIG. 1.

Referring to FIG. 2, portions of the circuit shown in FIG. 1 are shown in more detail. RAC switch 14 and MW switch 16 comprise optically coupled silicon controlled rectifiers 36, and light emitting diodes 38. Switch control circuit 28 turns light emitting diodes 38 on/off to produce the signal on RAC/MW bus 18.

In this invention the switching or connection of subscriber stations from the common bus occurs at or near a zero crossing of the audible signal voltage wave form. This switching is under the control of a square wave signal (ring SYNC signal) which has control edges referenced to zero voltage crossing of the audible control signal. A continuously present square wave signal (E-ring) is generated by software or common control circuitry which initiates switching the audible and visual control signals states of the composite signal. Command signals which command the switching of subscriber stations to or from the common bus, already discussed, are asynchronous with the E-ring signal. In the present invention the instantaneous value of the RAC signal is compared to the D-C value of the ring message waiting signal to generate a switching enable signal to ensure a substantially smooth transition between the RAC and message waiting state of the RAC/MW signal. According to the invention, the circuit selectively suppresses the controlling edge of the ring SYNC signal whenever the relative time of occurence of an E-ring signal controlling edge and a command signal controlling edge would cause switching of subscriber stations so that they would be connected to the RAC/MW bus at an inappropriate time. Consequently, the common problem of "bell tap" is eliminated.

There has thus been shown and described a novel circuit for switching between ring signal and message waiting signal which fulfills all the objects and advantages sought. Many changes, modifications, variations and other uses and applications of the invention will, however, become apparent to those skilled in the art after considering the specification and the accompanying drawings which disclose embodiments of the invention. All such changes, modifications, variations and other uses and applications which do not depart from the spirit and scope of the invention are deemed to be covered by the invention which is limited only by the claims which follow.

What is claimed is:

1. A circuit for switching between a ring signal and a message waiting signal without bell tap in a telephone system, comprising:
   (a) means for generating a composite RAC/MW signal which comprises an A-C signal and a D-C signal alternately spaced in time, the generating means comprising an RAC signal generator, an MW signal generator, and switching means for combining the RAC and MW signals into a composite RAC/MW signal;
   (b) a switch enable-signal generator comprising a comparator for comparing the instantaneous value of the RAC signal with the value of the MW signal, the switch enable generator providing a signal for changing the composite signal from an A-C signal to a D-C signal only when the instantaneous value of the RAC signal equals the value of the MW signal and the slope is negative;
   (c) means for producing either a RAC or MW signal to a particular subscriber station of a telephone system in response to an external command synchronous signal;
   (d) a RAC voltage zero crossing detector and synchronous signal generator for detecting when the RAC signal crosses zero point, and controlling when the appropriate RAC or MW signal is provided to a subscriber station in the telephone system; and
   (e) a synchronous edge suppression circuit for supressing the first ring synchronous pulse from the ring synchronous signal when the means for providing either an RAC or MW signal to a particular subscriber station signals that an MW signal should be provided during the time interval between the A-C signal crossing the D-C signal with a negative slope and before the subsequent positive going ring synchronous signal.

2. The circuit of claim 1, wherein said switching means comprises a plurality of optically gated silicon controlled rectifiers each optically coupled with an associated light emitting diode and a plurality of D-type flip-flops which control when the light emitting diodes are activated/deactivated.

3. The circuit of claim 1, wherein the means for providing either an RAC or MW signal to a particular subscriber station includes a station line circuit connecting the subscriber station with the circuit for switching between the ring signal and the message waiting signal, the station line circuit comprising a relay, responsive to an external command signal, which controls transmission of ring signal or message waiting signal to a particular subscriber station.

4. The circuit of claim 1, wherein the MW signal generator responsive to the RAC signal generator provides the MW signal, and the switching means comprises an RAC switch, an MW switch and a switch control circuit, the RAC and MW switches providing the composite RAC/MW signal responsive to the switch control circuit.

5. A circuit for providing a composite ringing signal and message waiting signal in a telephone system comprising:
(a) means for generating an alternating current signal and for generating a direct current signal responsive to the alternating current signal;
(b) generator control means for controlling the combination of the alternating current and direct current signals into the composite ringing and message waiting signal;
(c) a switch enable-signal generator comprising a comparator for comparing the instantaneous value of the alternating current signal with the value of the direct current signal, the swich enable-signal generator for providing a switch enable-signal to the generator control means when the instantaneous value of the alternating current signal is equal to the value of the direct current signal and the slope of the alternating current signal is negative; and
(d) busing means responsive to the generator control means, the busing means for transporting the composite ringing and message waiting signal to subscriber stations of the telephone system.

6. The circuit of claim 5 wherein the generator control means comprises an alternating current signal switch, a direct current signal switch, and a switch control circuit, the generator control means being further responsive to an enabling E-Ring signal for initiating a switching of the alternating current and direct current signals by the generator control means.

* * * * *

UNITED STATES PATENT AND TRADEMARK OFFICE
CERTIFICATE OF CORRECTION

PATENT NO. : 4,533,792
DATED : August 6, 1985
INVENTOR(S) : Binks et al

It is certified that error appears in the above—identified patent and that said Letters Patent is hereby corrected as shown below:

Correct Fig. 2, Sheet 2 of 2 as follows:

Uppermost diode 38 of RAC SWITCH 14 should be pointed away from +12v battery supply so as to be forward-biased.

Lowermost diode of MW SWITCH 16 should be pointed toward its cathode-connected resistor to conform with diodes 36 of RAC SWITCH 14.

Signed and Sealed this

Thirteenth Day of May 1986

[SEAL]

Attest:

DONALD J. QUIGG

Attesting Officer

Commissioner of Patents and Trademarks